3,325,377
DISTILLATION ANALYSIS CONTROL PROCESS FOR SEPARATING A LIQUID FEED MIXTURE CONTAINING LOW-BOILING AND HIGH-BOILING LIQUID COMPONENTS
Ernst Hackländer, Werl, Westphalia, Germany, assignor to Patentauswertung Vogelbusch Gesellschaft m.b.H., Vienna, Austria, a company of Austria
Filed May 22, 1963, Ser. No. 282,345
Claims priority, application Austria, June 2, 1962, A 4,487/62
1 Claim. (Cl. 203—3)

This invention relates to a method for the continuous distillation or rectification of liquid mixtures.

A binary mixture may be separated into its components by evaporation and condensation. If the distillation is carried out in a column, a certain relationship prevails on the several plates of this column between the compositions of the vapor and liquid phases. This relationship varies from plate to plate.

A distilling column of the type with which this invention is concerned consists essentially of a stripping section and a rectifying section. In the stripping section, the low-boiling component is removed from the liquid feed mixture. The high-boiling component is withdrawn from the bottom of the column through a siphon.

The vapor mixture rising from the stripping section is enriched with the lower-boiling component in the rectifying section by the reflux of condensate in a known manner.

In a distilling column operating in equilibrium, the amount of material in the feed equals the amount of the components withdrawn from the column. Each state of material balance is associated with a certain heat consumption for separating the components to the desired extent.

In known processes, the pressure and/or temperature at predetermined points of the distilling column are maintained constant. These processes maintain equilibrium in the distilling column, but they do not hold the heat input at the optimum value corresponding to the rate and/or concentration of the feed, and provide economically efficient operation of the distilling column only under one set of operating conditions.

According to the present invention, the concentration of one of the components of the distilling mixture, preferably the lower-boiling component is measured at any desired point of the column, and the deviation of the measured value from the desired value provides a measure for the necessary change in operating conditions. If the measured concentration is maintained constant, the distilling process is controlled in equilibrium in an economical manner, so as to achieve an optimum heat balance. There is no loss due to a variable feed rate or to a variable concentration of the low-boiling component in the feed.

The concentration of the low-boiling component may be determined in a sample of the vapor or liquid phase by chemical or physical methods, and control signals or control pulses may be generated in response to the measured value.

The signal for regulating the heat input for the stripping section of the column is preferably derived from the concentration of a liquid or vapor phase which contain less low-boiling component than the feed mixture or a vapor mixture in equilibrium with the boiling liquid feed mixture.

The signals for regulating the heat input for the rectifying section of the column are derived from the concentration of a liquid or vapor phase which contains more low-boiling component than the feed mixture.

The heat requirements of the stripping and rectifying sections usually differ. At relatively low concentration of the lower boiling component in the feed mixture, the heat input for the stripping section is usually higher than the heat input for the rectifying section. The concentration of low-boiling material in the feed mixture at which both column sections require the same heat input can be calculated. If the concentration of the low-boiling component in the feed exceeds this concentration, the rectifying section requires more heat than the stripping section. The concentration of low-boiling component in the feed mixture is thus measured and translated into control pulses for controlling the heat input for that section of the distilling column which requires more heat.

It is known to control the heat input into a distilling column according to the pressure at a fixed point of the distilling column so that the pressure at the measuring point is held constant at a value determined by experience which results in a constant heat input into the distilling column. There is, however, no direct physical relationship between the pressure and the heat input required for carrying out a specific distillation. In the known process the heat input is selected for operating conditions corresponding to the highest heat requirement. This avoids a loss of low-boiling component under all operating conditions, but under most conditions, the heat input is uneconomical because it is too high.

In the process of the invention, the heat input is regulated to the minimum required for carrying out a distillation in a given column. In a column whose heat input is controlled, a change in the concentration of low-boiling component in a liquid or vapor phase at a measurement point can only be caused by a disturbance of the materials balance.

To maintain the balance, the measured concentration of low-boiling component is translated into control signals for controlling the withdrawal of distillate from that section of the column which requires the lower heat input.

If the heat input to a distilling column is held constant by maintaining a constant pressure at a point in the column, the feed rate may be controlled according to the invention as a function of the concentration of a liquid or vapor phase which contains less low-boiling component than the feed.

The withdrawal rate of distillate is controlled according to the concentration of a liquid or vapor phase which contains more low-boiling component than the feed.

According to the invention, a vapor sample is withdrawn from the distilling column at a predetermined rate, mixed with metered air, and a predetermined portion of this air-vapor mixture is fed to an analyzing station.

In certain cases, it is preferred to cool a liquid sample withdrawn from the column to the temperature of the cooling water available, to pass air through the cooled sample, and to feed the resulting air-vapor mixture, which is in phase equilibrium with the withdrawn liquid sample, to the analyzing station.

More accurate analysis results are obtained if a vapor sample from the column is condensed, the condensate is cooled to the temperature of the cooling water available, air is passed through the cooled condensate and the air-vapor mixture formed, which is relatively rich in low-boiling component, is fed to the analyzing station.

If alcohol is the low-boiling component in the sample withdrawn from the column, its concentration may be determined colorimetrically by means of potassium bichromate in sulfuric acid, the color change of the reagent solution being translated into electric signals, which are amplified, if desired, and used for control purposes.

According to a preferred method, the instantaneous temperature resulting from the catalytic oxidation of the alcohol in the air-vapor mixture fed to the analyzing station is measured.

The process according to the invention, will be illustrated hereinafter by examples relating to the distillation of aqueous alcohol. It will be understood, however, that the process may also be used for distilling other mixtures.

In distilling columns of the type, in which the feed enters near the half-height of the column, and the distillate is enriched to 96.7% alcohol, the stripping and rectifying sections have the same heat requirement when the feed mixture contains 6.5% by volume alcohol, the balance being water. The stripping section has a higher heat requirement below 6.5% and the rectifying section has a higher heat requirement above 6.5%.

The following example is based on the assumed use of a distilling column having twelve theoretical stripping plates and of a liquid feed mixture having a constant alcohol concentration of 5.5% by volume. Under the assumed conditions, the heat requirement of the stripping section is higher than that of the rectifying section. The signal generator for controlling the heat input is connected to a point of the stripping section at the third plate from the bottom. If external influences cause a reduction in the feed rate by 10%, the alcohol content of the liquid on the third plate changes from 0.13% by volume to 0.07% by volume. Because known instruments can detect changes in alcohol content of as little as 0.01%, the change in the feed rate can be translated into control pulses or signals which vary the heat supply to the column until the alcohol content on the third plate returns to the original value. The heat supply is controlled to the most economical value at which losses of alcohol are virtually avoided.

Analogous results are obtained if the feed rate is constant but the alcohol content of the feed varies. The resulting change in the alcohol content on the plate causes the amount of heat supplied to the distilling column to be varied until the original condition on the sampled plate is restored.

In a column whose heat input is controlled according to the invention, the materials balance is controlled by signals generated in response to conditions in the rectifying section which control the distillate withdrawing valve. This permits the distillation to be carried out virtually without losses and with the least expenditure of heat at varying feed rates and varying concentrations of the low-boiling component in the feed.

In order to maintain equilibrium between the amount of heat supplied to the column and the amount of heat to be dissipated by the heat exchangers succeeding the column, the supply of cooling water to the heat exchangers succeeding the column is preferably controlled in response to the pressure at the top of the column. The pressure at the top of the column depends essentially on the resistance to vapor flow in the conduits to the gas cooler. If the pressure at the top of the column is held constant, alcohol vapor flows at a constant low rate to the gas cooler.

The accompanying drawings show apparatus according to the invention for carrying out the afore-described process. In the drawing.

Figure 1:
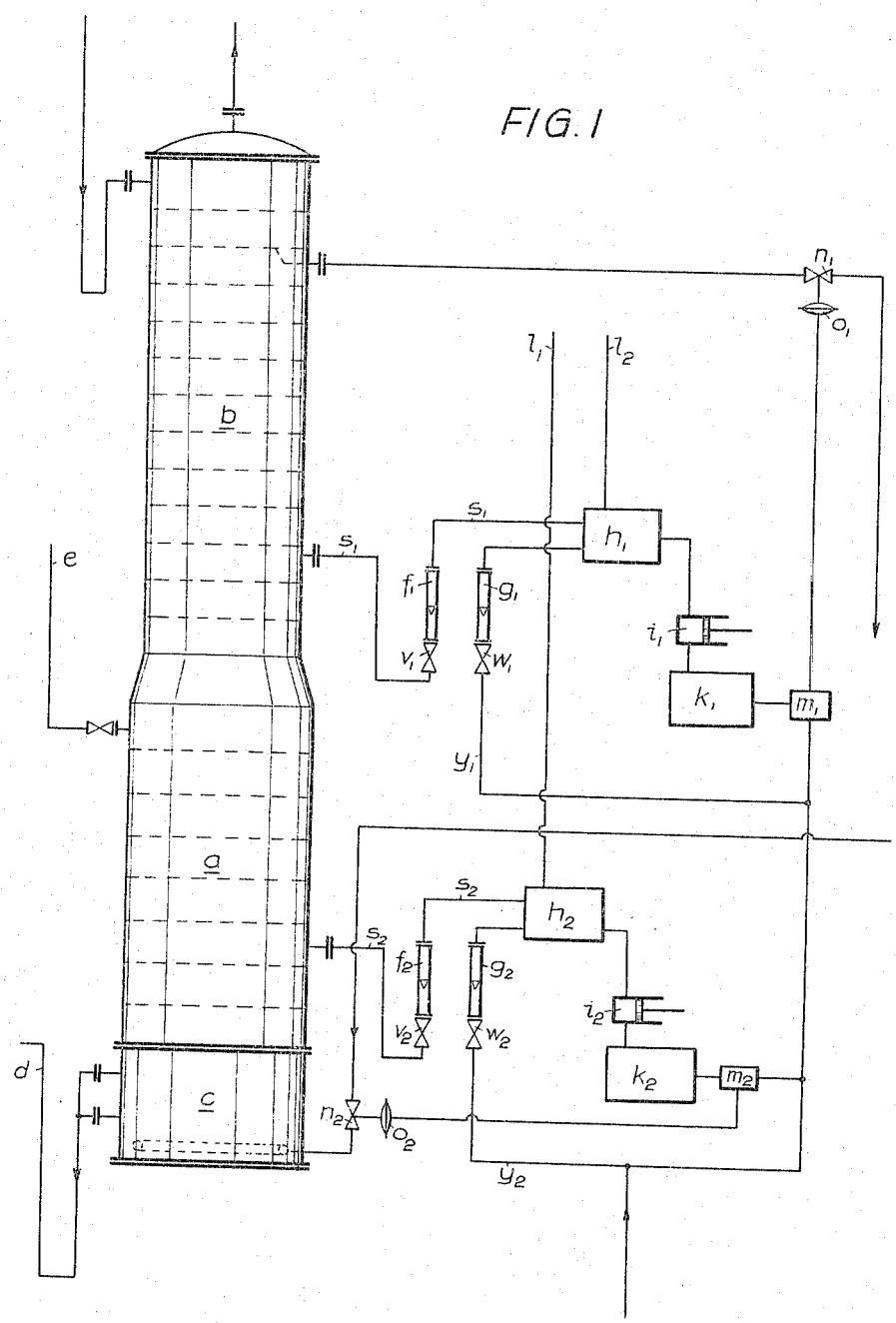
FIG. 1 shows a distilling column equipped with a control arrangement of the invention in schematic elevation.
Figure 3:
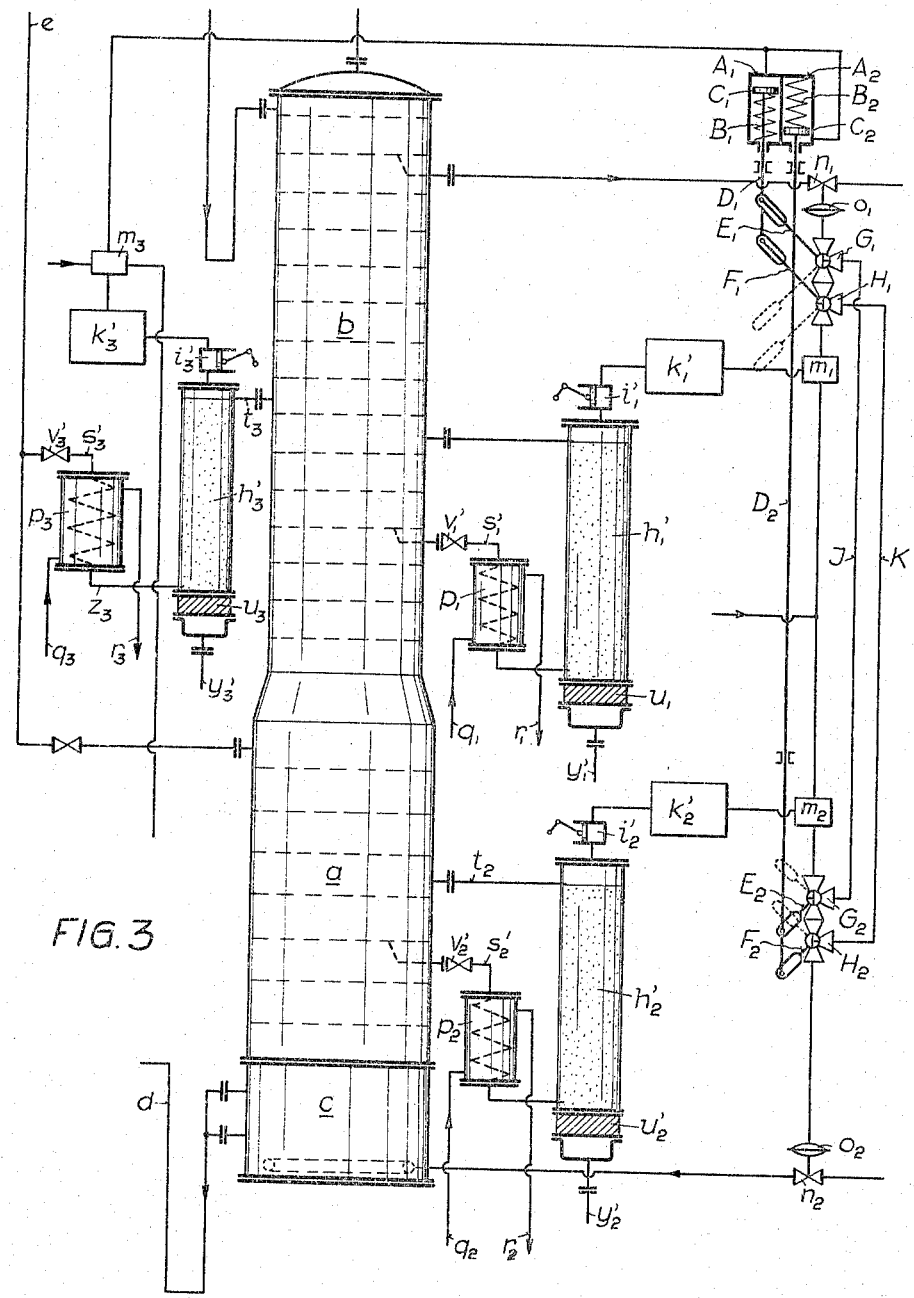
FIG. 3 shows yet other controls of the invention associated with the distilling column of FIG. 1.
Figure 4A:
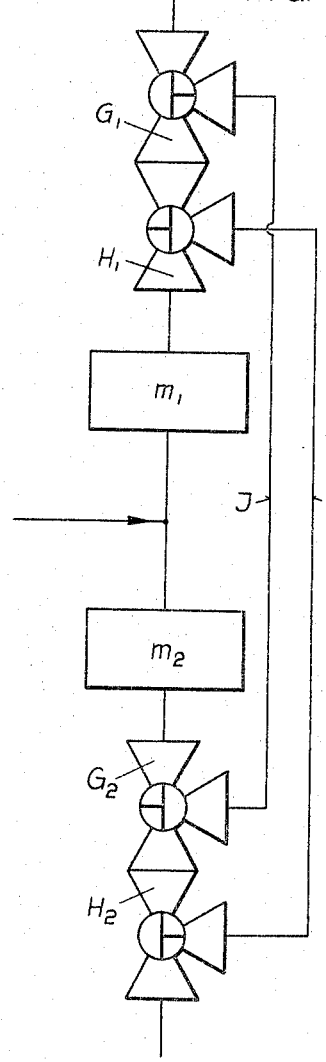
Figure 4B:
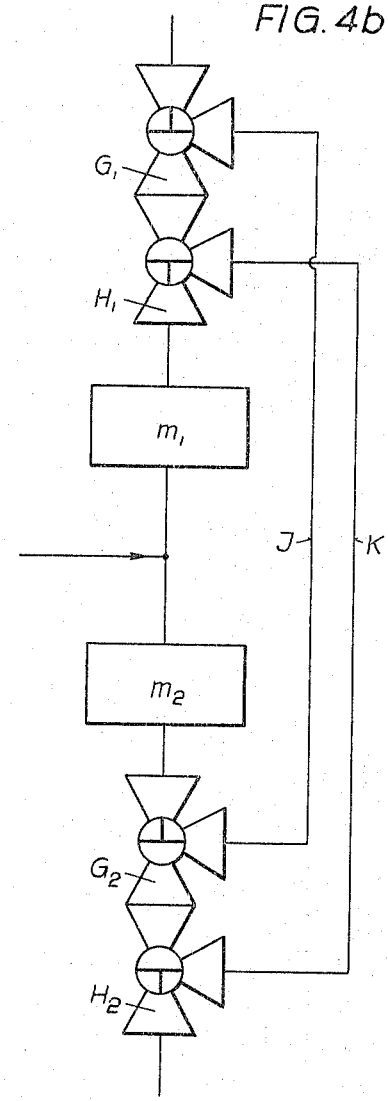
Figure 5:
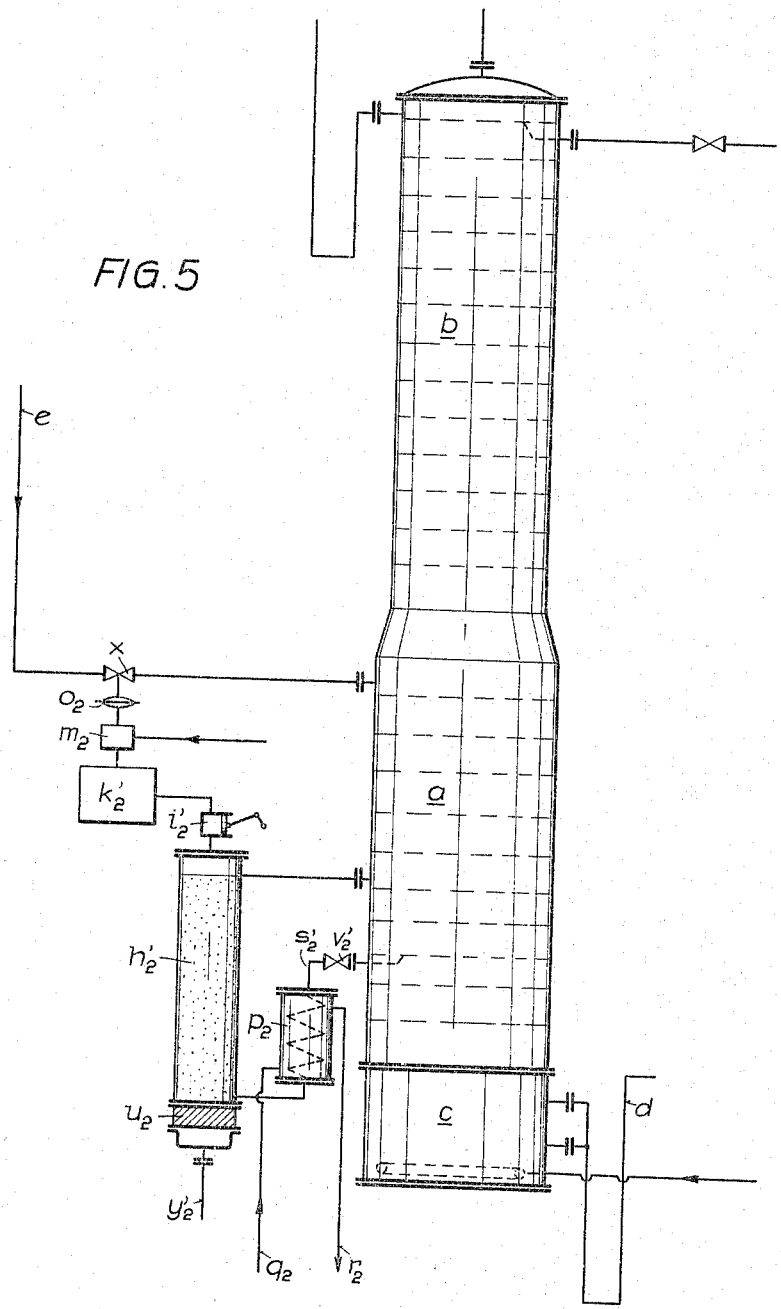

FIGS. 4a and 4b respectively illustrate a detail of the control arrangement of FIG. 3 on a larger scale in two operative positions; and FIG. 5 shows the column of FIG. 1 with yet different controls.

The column illustrated in FIG. 1 has a stripping section $a$ and a rectifying section $b$. An alcohol-water mixture containing less than 6.5% alcohol and preheated in a suitable manner, is fed to the column between the section $a$, $b$ through a feed conduit $e$. A distillation residue virtually free of alcohol is withdrawn from the bottom $c$ of the stripping section $a$ through a siphon $d$. In the rectifying section $b$, the vapor rising from the stripping section $a$ is enriched to the required final concentration by the reflux coming from the non-illustrated heat exchangers succeeding the column. Signals for controlling the materials balance are derived from the alcohol content of the vapor on one of the plates of the rectifying section. The signal for controlling the thermal equilibrium is derived from the alcohol content of the vapor on one of the plates of the stripping section. Samples of vapor are taken from the two column sections $a$, $b$ through sampling conduits $s_1$, $s_2$ at a low rate which may be adjusted by valves $v_1$, $v_2$. Flow meters $f_1$, $f_2$, preferably rotameters, are arranged in series with the valves. The two conduits $s_1$, $s_2$, are each connected to a mixing chamber $h_2$, $h_2$. Air is supplied to the mixing chambers $h_1$, $h_2$ through air conduits $y_1$, $y_2$ at a constant rate adjustable by two air valves $w_1$, $w_2$. The ratio between the feed rates of the alcohol-water vapor and the air to the mixing chambers must be constant, and may be checked by flow meters $g_1$, $g_2$ in series arrangement with the valves $w_1$, $w_2$.

In each mixing chamber $h_1$, $h_2$, the alcohol-water vapor is intimately mixed with compressed air, and a portion of the mixture is then supplied by means of metering pumps $i_1$, $i_2$ to analyzing stations $k_1$, $k_2$. The surplus of the mixture is discharged through conduits $l_1$, $l_2$. In the analyzing stations $k_1$, $k_2$, the alcohol content of the mixture of vapor and air is measured in the known manner described above, and the measured values are translated into primary control signals, which are transformed into secondary control signals by pneumatic amplifiers $m_1$, $m_2$. The pneumatic amplifiers $m_1$, $m_2$ are energized by the compressed air supply and control regulating valves $n_1$, $n_2$ by means of diaphragms $o_1$, $o_2$. The valves $n_1$, $n_2$ are respectively arranged in the distillate line from the top of the column and in the steam line to the column bottom, and maintain the desired materials balance and the associated thermal equilibrium.

Figure 2:
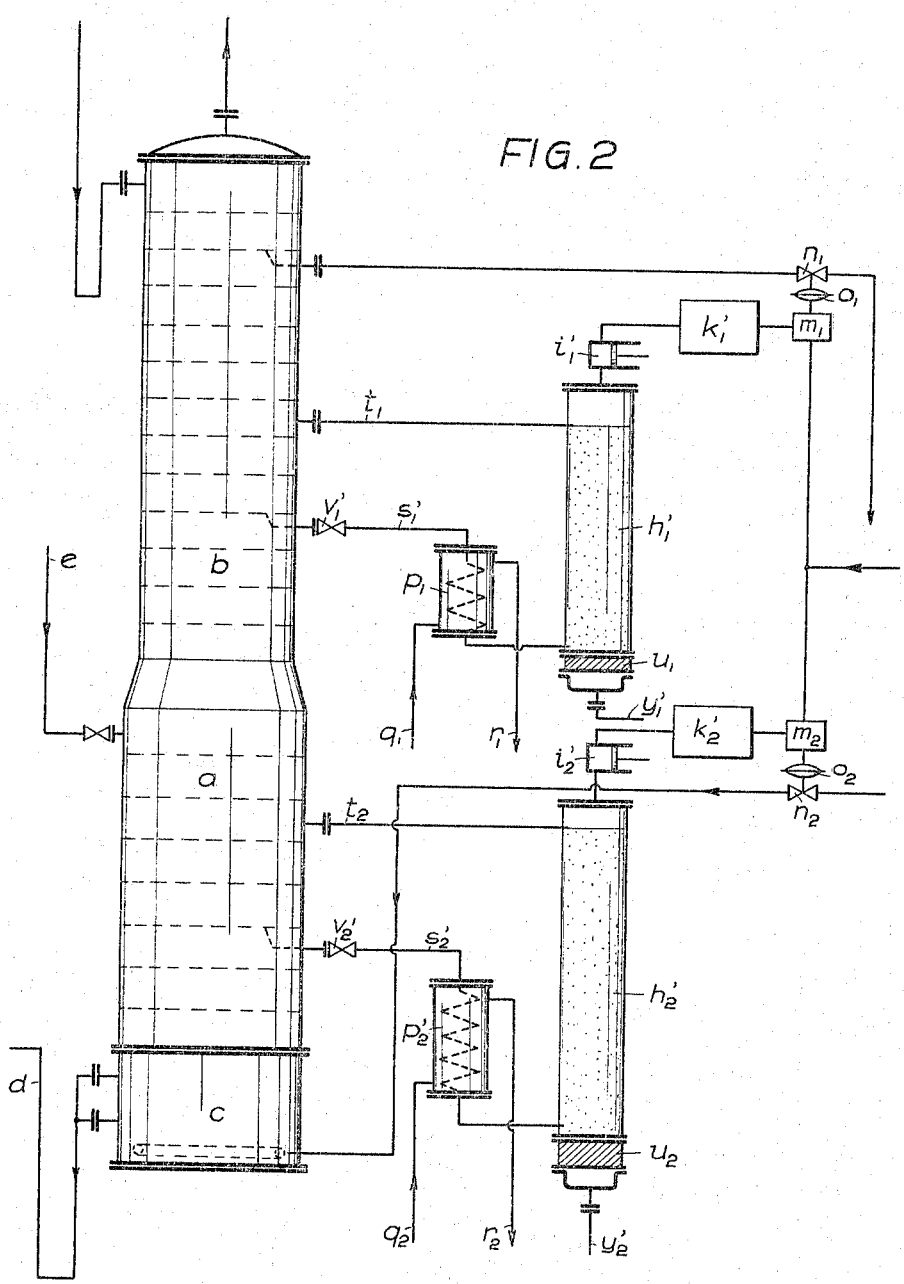
FIG. 2 shows the same column and associated modified controls in the manner of FIG. 1.

The column shown in FIG. 2 is fed preheated alcohol-water mixture through the conduit $e$, the mixture containing less than 6.5% alcohol. The signals for regulating the materials balance are derived from the alcohol content of the liquid mixture on one of the plates of the rectifying section. The signals for regulating the heat input for the distilling column are derived from the alcohol content of the liquid mixture on one of the plates of the stripping section. Samples are withdrawn from the two column sections through conduits $s'_1$, $s'_2$ at a predetermined rate. The time lag of the control process can be controlled by means of valves $v'_1$, $v'_2$ which regulate the rate at which the liquid samples are taken. The samples are passed through coolers $p_1$, $p_2$ of a sufficient capacity to cool the samples close to the virtually constant temperature of the cooling water supplied to the coolers $p_1$, $p_2$ through conduits $q_1$, $q_2$ and discharged through conduits $r_1$, $r_2$. The cooled samples are fed to mixing chambers $h'_1$, $h'_2$, provided with fritted clay discs $u_1$, $u_2$ for dispersing air in the liquid, and are returned to the column by conduits $t_1$, $t_2$. Metering pumps $i'_1$, $i'_2$ draw very finely dispersed air through the clay discs $u_1$, $u_2$ and the alcohol-water mixture in each chamber $h'_1$, $h'_2$. The air enriched with alcohol-water vapor by bubbling through the liquid in the chambers $h'_1$, $h'_2$ is fed to the analyzing stations $k'_1$, $k'_2$. The alcohol in the air sample is in equilibrium with the liquid in the chamber $h'_1$, $h'_2$. In the analyzing stations, the alcohol content of the air is measured and translated into primary control signals which are amplified in the manner described hereinbefore to form secondary control signals for the valves $n_1$, $n_2$.

Instead of the liquid on the plates, the vapor in equilibrium with the liquid may be sampled. In this case, the coolers $p_1$, $p_2$ must be of sufficient capacity to condense the vapor and to cool the condensate practically to the temperature of the cooling water.

FIG. 3 shows the same distilling column $a$, $b$ with a heated bottom $c$. An alcohol-water mixture, which may contain more or less than 6.5% alcohol, is fed to the column through conduit $e$. The primary signals for controlling the materials balance and the associated heat input are generated as described with reference to FIG. 2 and operate the valves $n_1$, $n_2$.

A portion of the alcohol-water feed mixture is withdrawn from conduit $e$ through a conduit $s'_3$ into a cooler $p_3$, where the sample stream is cooled close to the cooling water temperature, and from which it is fed through a conduit $z_3$ to a mixing cell $h'_3$. Primary control signals are generated in response to the alcohol content of the feed mixture in the manner described with reference to FIG. 2, and are transformed into secondary control signals in a pneumatic amplifier $m_3$. These signals channel control signals derived from the stripping and rectifying sections, respectively, to the proper regulating valves in response to the alcohol content of the liquid feed mixture.

If the liquid feed mixture has an alcohol content below 6.5% by volume, the valve $n_2$, which controls the rate of heat supply to the column, is to be controlled by a pulse derived from the stripping section $a$ whereas the regulating valve $n_1$, which controls the materials balance of the column, is to be controlled by a signal derived from the rectifying section $b$. If the alcohol content of the liquid feed mixture exceeds 6.5% by volume, the valve $n_2$ must be controlled by a signal derived from the rectifying section $b$ and the valve $n_1$ must be controlled by a signal derived from the stripping section $a$.

The pneumatic amplifier $m_3$ is designed so that no compressed air is supplied to two control cylinders $A_1$, $A_2$ if the alcohol content of the liquid feed mixture is below 6.5%. Two springs $B_1$, $B_2$ in the cylinders $A_1$, $A_2$ normally hold pistons $C_1$, $C_2$ in the illustrated positions. The pistons are connected by linkages $D_1$, $D_2$, and levers $E_1$, $F_1$, and $E_2$, $F_2$ to three-way valves $G_1$, $H_1$ and $G_2$, $H_2$ whose normal positions are shown on a larger scale in FIG. 4a. The control signals emitted by the pneumatic amplifier $m_1$ control the distillate valve $n_1$ when the three-way valves $H_1$, $G_1$ are in the position shown in FIG. 4a. In a similar manner, the pneumatic amplifier $m_2$ controls the heat input valve $n_2$.

If the alcohol content of the liquid feed mixture rises above 6.5% by volume, compressed air is supplied to the cylinders $A_1$ and $A_2$ to move the piston $C_1$, $C_2$ against the restraint of the springs $B_1$, $B_2$, whereby the valves $G_1$, $G_2$, $H_1$, $H_2$ are rotated through 90° into the positions shown in FIG. 4b. This causes pressure signals emitted by the amplifier $m_2$ to pass through the three-way valve $G_2$, a conduit J and the three-way valve $G_1$ to the diaphragm $o_1$ of the valve $n_1$ which controls the materials balance of the distilling column in response to a signal derived from the stripping section. The valve $n_2$ controls the thermal equilibrium of the column in response to pulses derived from that column section which requires a higher heat input, and the signals for the valve $n_1$ which controls the materials balance are derived from that column section which requires a lower heat input regardless of the composition of the feed.

FIG. 5 shows the same column $a$, $b$ having a heated bottom $c$. Preheated alcohol-water mixture containing less than 6.5% alcohol is fed to the column through the conduit $e$. It is assumed that the heat input to the column is controlled at a constant value by a non-illustrated arrangement generating signals in response to conditions on one of the lower plates of the stripping section $a$. Signals for regulating the materials balance are derived from the alcohol content of a liquid mixture or of a vapor mixture on one of the lower plates of the stripping section $a$. A primary control signal is fed to an amplifier $m_2$ in the manner described above with reference to the same amplifier in FIGS. 2 or 3, and the output signal of the amplifier determines the position of a regulating valve $x$ in the conduit $e$ so that a material balance corresponding to the constant heat input to the column is set by varying the feed rate of the liquid feed mixture.

What is claimed is:

A method of operating a distilling column having a stripping section and a rectifying section superimposed on said stripping section which comprises:

(a) feeding a continuous stream of a liquid mixture to a portion of said column intermediate said stripping and rectifying portions;

(b) withdrawing a continuous stream mainly consisting of a lower-boiling component of said mixture from the top of said rectifying section;

(c) withdrawing a higher-boiling component from the bottom of said stripping section;

(d) furnishing heat to said bottom portion at a rate sufficient to cause vapor to rise in said column and liquid to descend therein, said vapor and said liquid constituting fluids in heat exchange with each other;

(e) sensing the concentration of one of said components in one of said fluids in a portion of one of said sections spaced from said top and said bottom; the rate of flow in one of said streams and the rate of feeding of said heat input constituting two variables; and (f) controlling one of said variables in response to the sensed concentration; and in which method a first signal is generated in response to said sensed concentration, the concentration of said one component in one of said fluids is further sensed in the other one of said sections, and a second signal is generated in response to the concentration sensed in said other section, said concentration of said one component is additionally sensed in said feed mixture, and a third signal is generated in response to the sensed concentration of said component in said feed mixture, said rate of flow in the continuous stream withdrawn from said top of the rectifying section being varied in response to said first and third signals, and said rate of feeding input heat being varied in response to said second and third signals when the concentration sensed in said mixture is below a predetermined value; said rate of flow in said withdrawn stream from the top of said rectifying section being varied in response to said second and third signals and said rate of furnishing input heat being varied in response to said first and third signals when the concentration sensed in said feed mixture is above said predetermined value.

References Cited

UNITED STATES PATENTS

| | | | |
|---|---|---|---|
| 2,749,281 | 6/1956 | Ferro | 202—160 |
| 2,900,334 | 8/1959 | Miller | 202—160 |
| 2,977,289 | 3/1961 | Kron | 203—3 |
| 2,985,565 | 5/1961 | Bellinger | 202—160 |
| 2,990,437 | 6/1961 | Berger | 202—160 |
| 2,994,646 | 8/1961 | Kleiss | 202—160 |
| 3,018,230 | 1/1962 | Morgan | 203—3 |
| 3,021,263 | 2/1962 | Berger et al. | 203—3 |
| 3,111,460 | 11/1963 | Orr | 202—160 |
| 3,115,445 | 12/1963 | Kleiss et al. | 202—160 |
| 3,156,628 | 11/1964 | Larrison | 203—3 |

NORMAN YUDKOFF, *Primary Examiner.*

WILBUR L. BASCOMB, Jr., *Examiner.*